(12) United States Patent
Jiang et al.

(10) Patent No.: US 6,778,685 B1
(45) Date of Patent: Aug. 17, 2004

(54) TWO-STAGE LOCAL AND GLOBAL FINGERPRINT MATCHING TECHNIQUE FOR AUTOMATED FINGERPRINT VERIFICATION/IDENTIFICATION

(75) Inventors: Xudong Jiang, Singapore (SG); Wei Yun Yau, Singapore (SG); Wee Ser, Singapore (SG)

(73) Assignee: Nanyang Technological University (SG)

( * ) Notice: Subject to any disclaimer, the term of this patent is extended or adjusted under 35 U.S.C. 154(b) by 540 days.

(21) Appl. No.: 09/611,951

(22) Filed: Jul. 6, 2000

(30) Foreign Application Priority Data

Jul. 8, 1999 (SG) ............................................ 9903290

(51) Int. Cl.$^7$ ................................................ G06K 9/00
(52) U.S. Cl. ........................ 382/124; 382/125; 382/115
(58) Field of Search ................................ 382/124, 115, 382/116, 312, 315, 125; 340/5.53, 5.83; 396/15; 283/68, 78; D14/384

(56) References Cited

U.S. PATENT DOCUMENTS

| | | | | |
|---|---|---|---|---|
| 4,646,352 A | * | 2/1987 | Asai et al. .................. 382/125 |
| 5,623,552 A | * | 4/1997 | Lane .......................... 382/124 |
| 5,909,501 A | | 6/1999 | Thebaud | |
| 5,917,928 A | * | 6/1999 | Shpuntov et al. ........... 382/124 |
| 6,134,340 A | * | 10/2000 | Hsu et al. ................... 382/124 |
| 6,236,741 B1 | * | 5/2001 | Kovacs-Vajna ............. 382/125 |
| 6,487,306 B1 | * | 11/2002 | Jain et al. ................... 382/125 |
| 6,498,861 B1 | * | 12/2002 | Hamid et al. ............... 382/124 |

\* cited by examiner

*Primary Examiner*—Samir Ahmed
*Assistant Examiner*—Brian Le

(57) ABSTRACT

A method for determining a degree of match between a search fingerprint and a reference fingerprint comprises the following steps:

a) Extracting at least one first search feature from a first region of said search fingerprint thereby forming a local search feature vector, b) Extracting at least one second search feature from a second region of said search fingerprint thereby forming a global search feature vector, whereby said second region comprises said first region, c) Determining a first similarity degree by comparing said local search feature vector with a local reference feature vector, d) Determining a second similarity degree by comparing said global search feature vector with a global reference feature vector of said reference fingerprint and using said first similarity degree, e) Determining said degree of match from said second similarity degree.

5 Claims, 4 Drawing Sheets

US 6,778,685 B1

TWO-STAGE LOCAL AND GLOBAL FINGERPRINT MATCHING TECHNIQUE FOR AUTOMATED FINGERPRINT VERIFICATION/IDENTIFICATION

BACKGROUND OF THE INVENTION

This invention relates to a method, a device, a computer readable medium and a computer program element for matching fingerprints.

The word "fingerprint" is herein used as a representative of a fingerprint or a like pattern or figure. More particularly, the fingerprint may be an actual finger, a palm print, a toe print, a soleprint, a squamous pattern, and a streaked pattern composed of streaks. The fingerprint may also be a diagram drawn by a skilled person to represent a faint fingerprint which is, for example, left at the scene of a crime.

The "matching" is for identification of a fingerprint with reference to a plurality of known reference fingerprints. The matching may also be for discrimination, collation, and/or verification of the fingerprint.

In the following, the fingerprint which is to be recognized is called a search fingerprint. A stored fingerprint which is compared with said search fingerprint is called reference fingerprint.

U.S. Pat. No. 5,633,947 describes a method and an apparatus for fingerprint characterization and recognition using an auto correlation approach. A fingerprint image is captured and a binary image of said fingerprint image is determined. Furthermore, said binary image is replicated. Said replica is overlaid on said binary image and an auto-correlation pattern having a displacement modulus equal to a fractional part of the mean fingerprint inter-ridge spacing and a displacement vector rotated through a vector argument in incremental steps is generated.

U.S. Pat. No. 5,493,621 discloses an approach to match a fingerprint by setting up a graph. A master point is the minutia nearest to a center. A sub-branch point is then selected from the nearest point to the master point in each quadrant, followed by sub-sub-branch points in increasing distance. Positional relationship between each branch point with the master point and the sub-sub-branch points in each quadrant are recorded as well as the number of branch points. These data are subsequently used for matching.

In U.S. Pat. No. 4,896,363 a distance spectrum is used for fingerprint matching. In this method, a set of points representative of the characteristic features of a fingerprint image and a set of points representative of the characteristic features of a reference image are determined, respectively. For each point in the set of points, a spectrum of values representing the distances between the point and each other point in the set of points is calculated.

U.S. Pat. No. 4,790,564 describes a method in which at least one search print minutia is replicated by varying at least one of its coordinates of location and angle, thereby obtaining at least one additional minutia which is different from said search print minutia in at least one of said coordinates. Said search print minutia is compared against the minutiae of pre-stored file prints.

In U.S. Pat. No. 4,135,147 means responsive to minutiae of first and second patterns for selectively generating a plurality of sets of neighborhood comparison signals representative of the closeness of match and coordinate and orientation displacements between minutiae neighborhoods of the first and second patterns are described. Each set of neighborhood comparison signals comprises a match score and associated coordinate and orientation displacement signals respectively representative of the closeness of match and coordinate and orientation displacements between a minutiae neighborhood of the first minutiae pattern and a minutiae neighborhood of the second pattern. The comparison uses a plurality of three-dimensional ranges of different displacements in a three-coordinate system for adding in each three-dimensional range all match scores whose associated sets of displacement signals represent displacements lying within that three-dimensional range in order to find the three-dimensional range having the highest combined match score, the highest combined match score being indicative of the relative closeness of match between the first and second patterns.

Block-based matching of fingerprints is described in U.S. Pat. No. 5,239,590.

U.S. Pat. No. 5,613,014 describes a method to match fingerprints using an attribute relational graph.

In U.S. Pat. No. 5,631,972 a hyperladder approach is used to perform fingerprint matching.

U.S. Pat. No. 4,646,352 describes a method and a device for matching fingerprints, wherein a pair candidate list is formed by selecting minutia pairs with reference to a minutia list showing original position and direction data given for minutiae by principal coordinate systems preliminarily selected on a search and a file fingerprint and those relation data of the minutiae which are substantially independent of the coordinate systems. One of the coordinate systems is transformed by those optimum amounts to provide transformed position and direction data which are decided by the original position and direction data of the minutia pairs of the pair candidate list. A pair list is formed by precisely selecting minutiae from the pair candidate list with reference to the transformed position and direction data and the original position and direction data given by the other principal coordinate system and to the relation data. On forming the pair list, an additional minutia list is preferably formed which shows the transformed position and direction data and the last-mentioned original position and direction data together with the relation data.

A minutiae consists of a set of invariant and disciminating features of a fingerprint. It is a local discontinuity of a fingerprint ridge (ridge ending and ridge bifurcation).

One of the disadvantages of these known methods are the uncertainty of the matching result.

SUMMARY OF THE INVENTION

It is thus an object of the present invention to determine a degree of match between a search fingerprint and a reference fingerprint with a higher degree of certainty than it is possible using the known methods described above.

The object is met with a method, a device, a computer readable medium and a computer program element for matching fingerprints with features according to the independent claims.

A method for determining a degree of match between a search fingerprint and a reference fingerprint comprising the following steps:

a) Extracting at least one first search feature from a first region of said search fingerprint thereby forming a local search feature vector, b) Extracting at least one second search feature from a second region of said search fingerprint thereby forming a global search feature vector, wherein said second region comprises said first region, c) Determining a first similarity degree by comparing said local search feature vector with a local reference feature vector of said reference fingerprint, d) Determining a second similarity degree by comparing said global search feature vector with a global reference feature vector of said reference fingerprint and using said first similarity degree, e) Determining said degree of match from said second similarity degree.

A device for determining a degree of match between a search fingerprint and a reference fingerprint comprising:

a) Means for extracting at least one first search feature from a first region of said search fingerprint thereby forming a local search feature vector, b) Means for extracting at least one second search feature from a second region of said search fingerprint thereby forming a global search feature vector, wherein said second region comprises said first region, c) Means for determining a first similarity degree by comparing said local search feature vector with a local reference feature vector of said reference fingerprint, d) Means for determining a second similarity degree by comparing said global search feature vector with a global reference feature vector of said reference fingerprint and using said first similarity degree, e) Means for determining said degree of match from said second similarity degree.

A computer readable medium having a program recorded thereon, where the program is to make the computer execute a procedure, comprising the following steps for determining a degree of match between a search fingerprint and a reference fingerprint:

a) Extracting at least one first search feature from a first region of said search fingerprint thereby forming a local search feature vector, b) Extracting at least one second search feature from a second region of said search fingerprint thereby forming a global search feature vector, wherein said second region comprises said first region, c) Determining a first similarity degree by comparing said local search feature vector with a local reference feature vector of said reference fingerprint, d) Determining a second similarity degree by comparing said global search feature vector with a global reference feature vector of said reference fingerprint and using said first similarity degree, e) Determining said degree of match from said second similarity degree.

A computer program element which is to make the computer execute a procedure comprising the following steps for determining a degree of match between a search fingerprint and a reference fingerprint:

a) Extracting at least one first search feature from a first region of said search fingerprint thereby forming a local search feature vector, b) Extracting at least one second search feature from a second region of said search fingerprint thereby forming a global search feature vector, wherein said second region comprises said first region, c) Determining a first similarity degree by comparing said local search feature vector with a local reference feature vector of said reference fingerprint, d) Determining a second similarity degree by comparing said global search feature vector with a global reference feature vector of said reference fingerprint and using said first similarity degree, e) Determining said degree of match from said second similarity degree.

By the invention local and global information (features) are used, thereby enhancing the certainty of the result.

The result is robust to a nonlinear deformation of an image of the fingerprint due to variation in pressure and the pressing manner.

A further advantage of the invention is, that the method is fast to compute thereby being suitable for an online fingerprint verification and/or fingerprint identification.

The invention may be implemented in a programmable computer device as well as with a special electronic circuit.

Advantageous embodiments of the invention are claimed in the dependent claims.

The further described embodiments are valid for the method as well as the device, the computer readable medium and the computer program.

Said features may describe minutiae of said fingerprints or a relation between minutiae of said fingerprints.

Features may be used which are independent from rotation and/or translation of the fingerprints compared with a given coordinate system.

The invention may further comprise the following features:
said first region comprises a given first amount of neighbor minutiae,
said second region comprises a given second amount of neighbor minutiae,
said second amount is larger than said first amount.

The invention may further comprise the following features:
Determining said first similarity degree for all minutiae in said first region,
Determining a best match local structure pair of minutiae by using said first similarity degrees,
Aligning all minutiae in said second region based on said best match local structure pair, thereby forming said global search feature vector.

In a further embodiment, said first similarity degree cl(k1, k2) is determined using the following formula:

$$cl(k1, k2) = \begin{cases} \frac{b1 - W \times |FL_{k1}^S - FL_{k2}^R|}{b1}, & \text{if } W \times |FL_{k1}^S - FL_{k2}^R| < b1 \\ 0, & \text{Others} \end{cases}$$

wherein
b1 is a freely selectable local threshold,
W is a freely selectable weight vector that specifies the weight associated with each component of said feature vector,
$FL_{k1}^S$ is a local search feature vector of minutia k1,
$FL_{k2}^R$ is a local reference feature vector of minutia k2.

Furthermore, said second similarity degree cg(k1, k2) may be determined using the following formula:

$$cg(k1, k2) = \begin{cases} cl(k1, k2), & \text{if } |FG_{k1b}^S - FG_{k2b}^R| < bg \\ 0, & \text{Others} \end{cases},$$

wherein
bg is a freely selectable global threshold vector,
$FG_{k1b}^S$ is a global search feature vector of minutia k1,
$FG_{k2b}^R$ is a global reference feature vector of minutia k2.

In a further preferred embodiment of the invention said degree of match is determined using the following formula:

$$ms = \frac{\sum cg(k1, k2)}{\max(N1, N2)},$$

wherein N1 and N2 are the numbers of minutiae in a common region of said search fingerprint and said reference fingerprint.

By these features, even a better and more robust result is achieved.

DESCRIPTION OF THE PREFERRED EMBODIMENTS

Preferred embodiments of this invention and modifications thereof will now be described with reference to the accompanying drawings.

Figure 1:
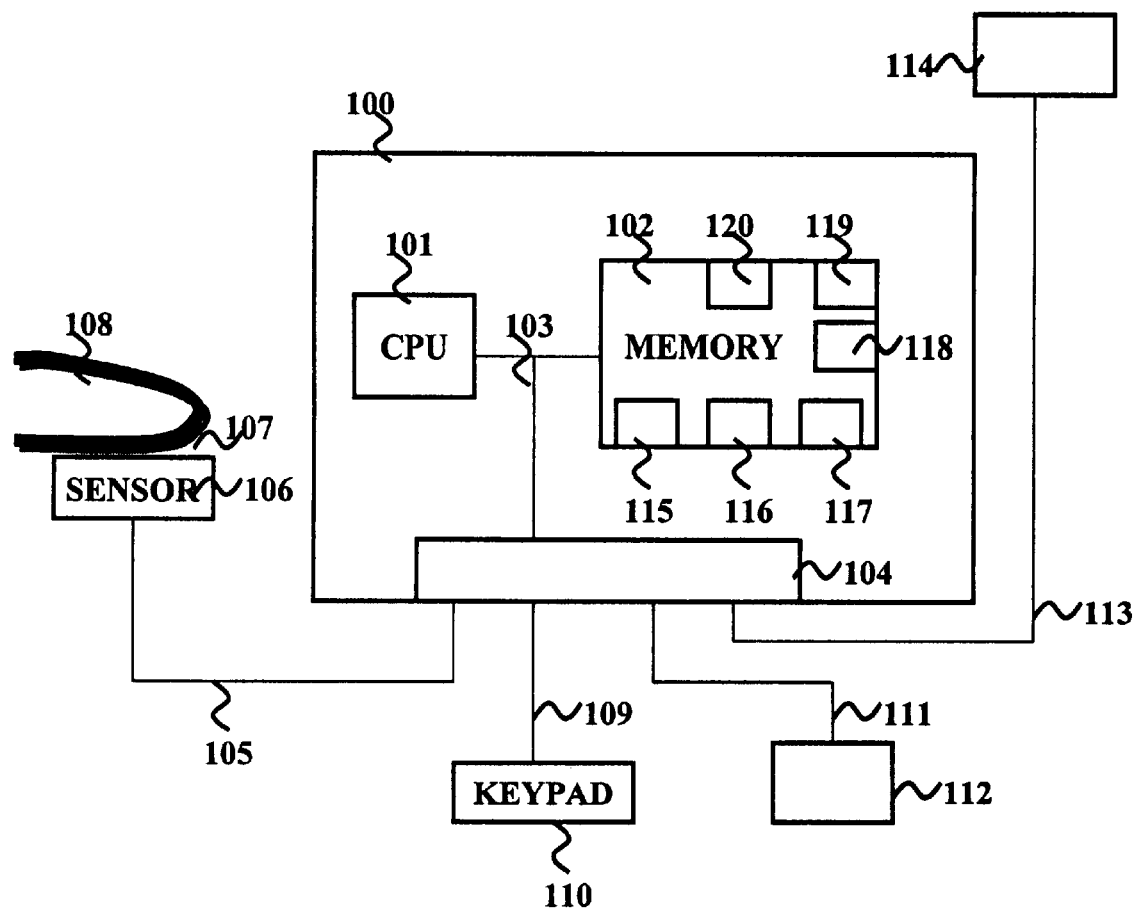
FIG. 1 is a block diagram of a computer system which is used to perform the steps of the method.

FIG. 1 shows a computer 100 comprising a central processing unit (CPU) 101, a storage device 102, a bus 103, and an input/output-interface 104.

Said central processing unit 101, said storage device 102 and said input/output-interface 104 are connected with said bus 103 for exchanging electrical signals.

Via said input/output-interface 104 and a first connection 105, said computer 100 is connected with a fingertip sensor 106, with which an image of a fingertip 107 is taken from a finger 108. Furthermore, via said input/output-interface 104 and a second connection 109, said computer 100 is connected with a keypad 110, and via a third connection 111, said computer 100 is connected with a read device 112, like a card or a smartcard reader. Via said input/output-interface 104 and a fourth connection 113, said computer 100 is connected with a display 114.

After said sensor 106 has taken said image of the fingertip, said image is sent from said sensor 106 to said computer 100, where it is stored in an image memory portion 115 of said memory 102. In said memory 102, there is stored a computer program 117, which makes said computer 100 execute a procedure comprising the following steps, which will now be described in detail.

For the further explanation it is assumed, that the image of the fingertip 107 comprises n minutiae, which are extracted from said image 115.

Figure 2:
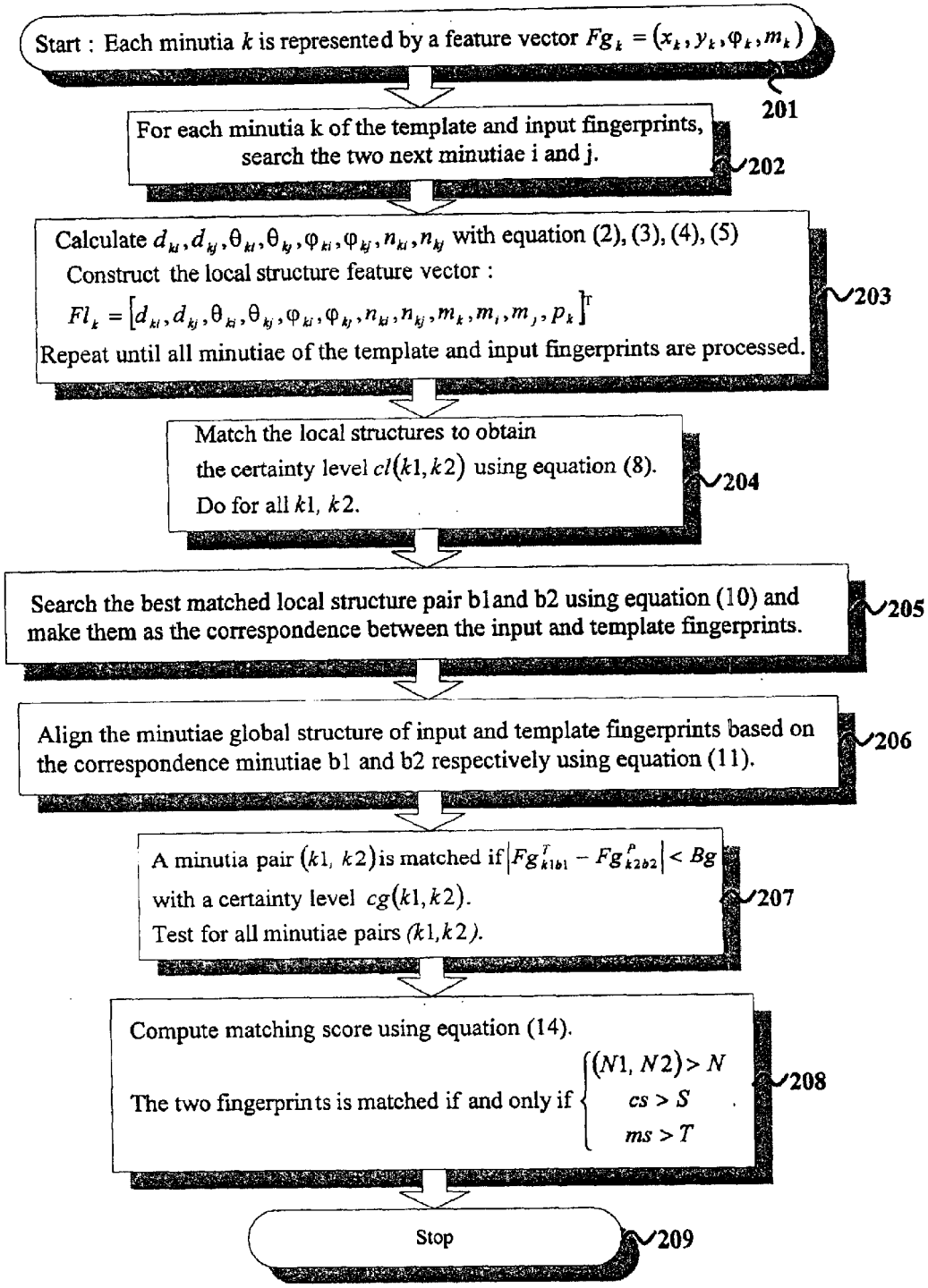
FIG. 2 is a flowchart of the method for determining the degree of match.

For each minutia k (k=1, ..., n) a minutia feature vector $FG_k$ 116 is determined and stored in said memory 102 (cf. Step 201 in FIG. 2). Said minutia feature vector $FG_k$ 116 comprises the following features:

$$FG_k = \begin{pmatrix} x_k \\ y_k \\ \varphi_k \\ m_k \end{pmatrix}, \tag{1}$$

wherein $x_k$ is a first coordinate of said minutia in a given right-hand orthogonal coordinate system, $y_k$ is a second coordinate of said minutia in said coordinate system, $\phi_k$ is a direction ($-\pi < \phi_k \leq \pi$), which is defined as a local ridge direction of an associated ridge of said minutia, $m_k$ is a minutia type out of a given amount of minutia types.

The global characteristics of said minutia such as said first coordinate $x_k$, said second coordinate $y_k$ and said direction $\phi_k$ are dependent on the position and orientation of said finger 108 on said fingertip sensor 106 when said fingertip 107 is acquired. These are not rotation and translation invariant.

In a second step (step 202), for each minutia k of the image 115, the two next minutia i and j respectively are determined.

For each minutia k of the image 115, the following features of said minutia are determined (Step 203):

a first distance $d_{ki}$ between a first minutia point k and a point of a first neighborhood minutia i, a second distance $d_{kj}$ between said first minutia point k and a point of a second neighborhood minutia j, a first ridge count $n_{ki}$ between said first minutia point k and said point of said first neighborhood minutia i, a second ridge count $n_{kj}$ between said first minutia point k and said point of said second neighborhood minutia j, a first relative angle $\Theta_{ki}$ between said first minutia point k and said point of said first neighborhood minutia i, a second relative angle $\Theta_{kj}$ between said first minutia point k and said point of said second neighborhood minutia j, a first ridge direction $\Theta_{ki}$, and a second ridge direction $\Theta_{kj}$.

Said first distance $d_{ki}$ is determined according to the following formula:

$$d_{ki} = \sqrt{(x_k - x_i)^2 + (y_k - y_i)^2} \tag{2}$$

wherein $x_i$ is a first coordinate of said point of said first neighborhood minutia i in said coordinate system, $y_i$ is a second coordinate of said point of said first neighborhood minutia i in said coordinate system.

Said first relative angle $\Theta_{ki}$ is determined according to the following formula:

$$\Theta_{ki} = \begin{cases} \tan^{-1}\left(\frac{y_k - y_i}{x_k - x_i}\right) - \varphi_k & \text{if } -\pi < \tan^{-1}\left(\frac{y_k - y_i}{x_k - x_i}\right) - \varphi_k \leq \pi \\ 2\pi + \tan^{-1}\left(\frac{y_k - y_i}{x_k - x_i}\right) - \varphi_k, & \text{if } \tan^{-1}\left(\frac{y_k - y_i}{x_k - x_i}\right) - \varphi_k \leq -\pi \\ 2\pi - \tan^{-1}\left(\frac{y_k - y_i}{x_k - x_i}\right) + \varphi_k, & \text{if } \tan^{-1}\left(\frac{y_k - y_i}{x_k - x_i}\right) - \varphi_k > \pi \end{cases} \tag{3}$$

Said first ridge direction $\phi_{ki}$ is determined according to the following formula:

$$\varphi_{ki} = \begin{cases} \varphi_i - \varphi_k, & \text{if } -\pi < \varphi_i - \varphi_k \leq \pi \\ 2\pi + \varphi_i - \varphi_k, & \text{if } \varphi_i - \varphi_k \leq -\pi \\ 2\pi - \varphi_i + \varphi_k, & \text{if } \varphi_i - \varphi_k > \pi \end{cases} \quad (4)$$

Said second distance $d_{kj}$, said second relative angle $\Theta_{kj}$, said second ridge direction $\phi_{kj}$ are also determined using formulas (2), (3), (4), respectively, wherein the index i is then exchanged by the index j.

These features are independent from the rotation and translation of said finger 108 on said fingertip sensor 106 when said fingertip 107 is acquired.

After having determined said features described above, for each of the n minutiae a local search feature vector $FL_k$ 118 is determined and stored in said memory 102 according to:

$$FL_k = \begin{pmatrix} d_{ki} \\ d_{kj} \\ \Theta_{ki} \\ \Theta_{kj} \\ \varphi_{ki} \\ \varphi_{kj} \\ n_{ki} \\ n_{kj} \\ m_k \\ m_i \\ m_j \\ p_k \end{pmatrix}, \quad (5)$$

wherein $d_{ki}$ is said first distance, $d_{kj}$ is said second distance, $\Theta_{ki}$ is said first relative angle, $\Theta_{kj}$ is said second relative angle, $\phi_{ki}$ is said first ridge direction, $\phi_{kj}$ is said second ridge direction, $n_{ki}$ is said first ridge count, $n_{kj}$ is said second ridge count, $m_k$ is a minutia type of minutia k, $m_i$ is a minutia type of minutia i, $m_j$ is a minutia type of minutia j, $p_k$ is a parameter which describes the type of both the ridges and valleys in the neighborhood of the minutia k.

As mentioned above, said parameter m describes the minutiae type, wherein e.g. m=0 in case of a ridge ending and m>0 in case of a ridge bifurcation. The parameter $n_{ki}$ describes said ridge count, i.e. the number of ridges, between the minutiae k and i. Said parameter $p_k$ describes the type of both the ridges and valleys in the neighborhood of the minutia k and is obtained by considering only the endings of said ridges and valleys. For example, if there are 4 ridges and 4 valleys in the neighborhood of the minutia k which are to be described, $p_k$ is a vector consisted of 8 components. The value of each component of such a vector may then be 0, 1 and 2 depending on whether the corresponding ridge or valley has no ending, one ending or two endings. The search for the ending can be done for the entire ridge and valley or in a freely specified region only.

Therefore, the parameters n and p describe the local characteristics of the minutiae in their respective neighborhood and are determined by using the image of the search fingerprint.

The element of the vector is ordered in such a way that the first element corresponds to the nearest minutia found, followed by the second nearest and so on.

Figure 3:
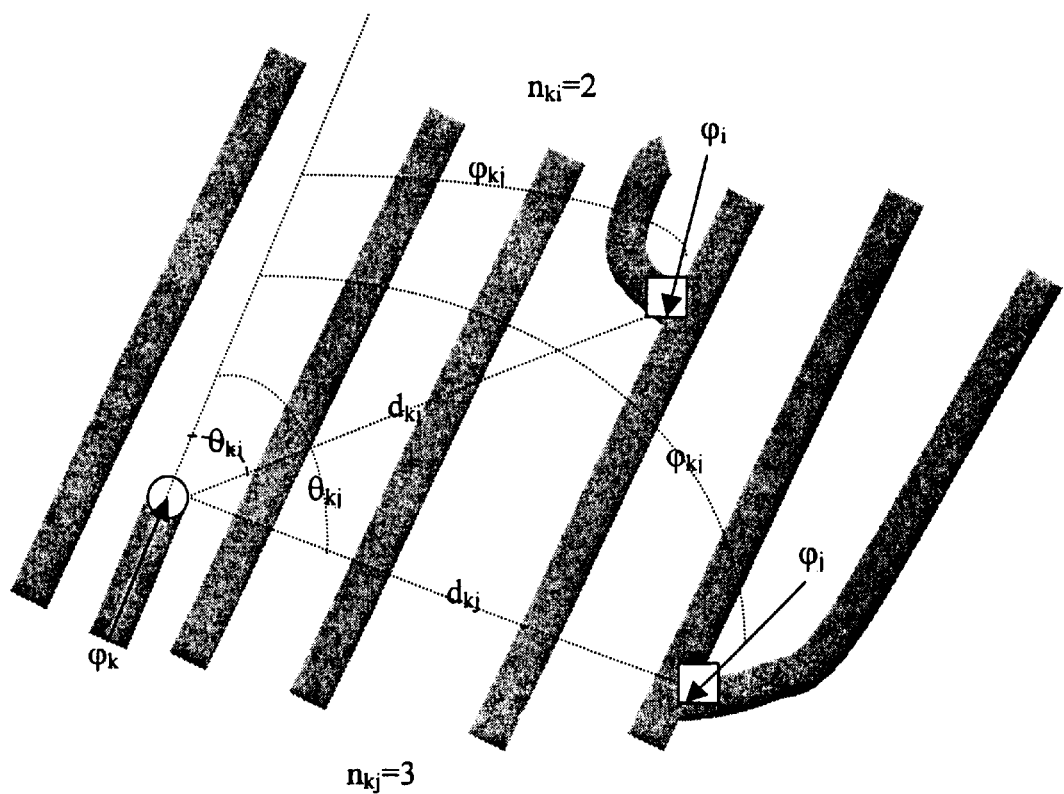
FIG. 3 is a minutia local structure of two nearest neighborhood minutiae to a minutia.

Referring to FIG. 3, for said minutia k, a local structure of the two nearest neighborhood minutia is shown including the features described above. For each of the minutia, the local structure is divided into four quadrants by two perpendicular axes. A first axis x is normal to the direction of the minutia while a second axis y is tangential to the minutia direction. The number of minutiae in each quadrant shall not exceed a maximum value, g. Typically, the number neighborhood minutiae taken into account is less than 6 and the value for g in such a case is 2.

In a further step (step 204), a first similarity degree cl(k1, k2) for all k1, k2 is determined by comparing each stored local search feature vector $FL^S_{k1}$ of the search fingerprint with local reference feature vectors $FL^R_{k2}$ 119 which describe one or more reference fingerprints, the search fingerprint is to be compared to in order to verify or identify, respectively, a search fingerprint.

The reference feature vectors $FL^R_{k2}$ 119 of the reference fingerprint(s) are formed in advance in the same way as said local search feature vector $FL^S_{k1}$ of said search fingerprint. Thus it is to be understood that there are stored n local search feature vectors $FL^S_{k1}$ of the search fingerprint to be identified/verified. Further, in case of identification of a search fingerprint the local reference feature vectors $FL^R_{k2}$ 119 of a free amount of reference fingerprints are stored in advance in said memory 102 or in an external memory (not shown), wherein the external memory is connected to the computer 100 via the input/output-interface 104. In case of verification of a search fingerprint, the local reference feature vectors $FL^R_{k2}$ 119 of a reference fingerprint, by which the search fingerprint is to be verified, are either selected from the local reference feature vectors of the reference fingerprints stored in the memory 102 or the external memory by the user via the keypad 110 or input from a card, smartcard or the like via the read device 112.

Said local search feature vectors $FL^S_{k1}$ are now matched to said earlier stored local reference feature vectors $FL^R_{k2}$, forming said first similarity degree cl(k1, k2) for all minutiae k1 of said search fingerprint and for all minutiae k2 of each of said reference fingerprints.

Said first similarity degree cl(k1, k2) is determined according to the following formula:

$$cl(k1, k2) = \begin{cases} \dfrac{b1 - W \times |FL^S_{k1} - FL^R_{k2}|}{b1}, & \text{if } W \times |FL^S_{k1} - FL^R_{k2}| < b1 \\ 0, & \text{Others} \end{cases} \quad (6)$$

with $$W = (w_d, w_d, w_\Theta, w_\Theta, w_\phi, w_\phi, w_n, w_n, w_m, w_m, w_m, w_p), \quad (7)$$

wherein b1 is a freely selectable local threshold,

W is a weight vector that specifies the weight associated with each component of said feature vector, $FL^S_{k1}$ is a local search feature vector of minutia k1, $FL^R_{k2}$ is a local reference feature vector of minutia k2.

The possible range of said first similarity degree cl(k1, k2) is $0 \leq cl(k1, k2) \leq 1$. Thus, cl(k1, k2)=1 implies a perfect match while cl(k1, k2)=0 implies a total mismatch.

In a further step (step 205), a best match of local structure pairs cl(b1, b2) of search feature vector and reference feature vector is determined. Said best match is obtained by maximizing said first similarity degree cl(k1, k2) as:

$$cl(b1, b2) = \max_{k1, k2}(cl(k1, k2)). \quad (8)$$

Said best match of local structure pairs cl(b1, b2) of search feature vector and reference feature vector is now used as a reliable correspondence of the two compared fingerprints.

All other minutiae will be aligned based on this corresponding pair, which will be named as base. Supposing said base of a fingerprint found is $(x_b, y_b, \phi_b)^T$, (b=b1, b2), then all the other minutiae of the respective fingerprint are described with respect to said base minutia.

Thus, for each minutia, a global search feature vector $FG_{kb}$ is determined using the following formula (step 206):

$$FG_{kb} = \begin{pmatrix} d_{kb} \\ \Theta_{kb} \\ \varphi_{kb} \\ m_{kb} \end{pmatrix} = \begin{pmatrix} \sqrt{(x_k - x_b)^2 + (y_k - y_b)^2} \\ \tan^{-1}\left(\frac{y_k - y_b}{x_k - x_b}\right) - \varphi_b \\ \varphi_k - \varphi_b \\ m_k \end{pmatrix}, \forall k, k \neq b. \quad (9)$$

wherein the vector parameters have the same meaning as those used in the local search feature vector. However, the parameters n and p being descriptive for the local characteristics of the minutiae as mentioned above are, in general, not included in the global search feature vector to avoid unnecessary repetition.

Having determined said global search feature vectors $FG^S_{k1b}$, they are subsequently matched to earlier stored global reference feature vectors $FG^{Rk2b}$ 120, which were determined in the same way as said global search feature vectors $FG^{Sk1b}$ using formula (9) described above.

The result of said matching is a second similarity degree cg(k1, k2) for all minutia pairs (k1, k2) of said search fingerprint and of said reference fingerprints.

Said second similarity degree cg(k1, k2) is determined according to the following formula (step 207):

$$cg(k1, k2) = \begin{cases} cl(k1, k2), & \text{if } |FG^S_{k1b} - FG^R_{k2b}| < bg \\ 0, & \text{Others} \end{cases} \quad (10)$$

wherein bg is a freely selectable global threshold vector.

Equation (10) increases the reliability of the result because cg(k1, k2) is nonzero only if minutiae k1 and k2 are both locally and globally matched. This means with other words that the second similarity degree is determined by both comparing said global feature vectors and using the first similarity degree. Moreover, through the use of Equation (10) a soft decision is provided instead of a simple result "matched" or "unmatched".

Figure 4:
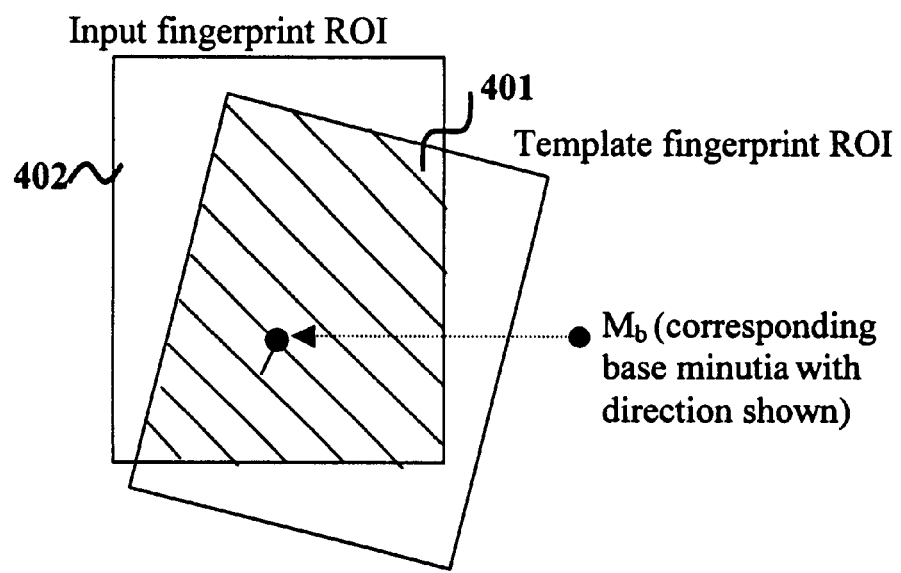
FIG. 4 shows a common region of a search fingerprint and a reference fingerprint.

Finally (step 208) a degree of match ms is computed according to the following formula:

$$ms = \frac{\sum cg(k1, k2)}{\max(N1, N2)}, \quad (11)$$

wherein N1, N2 are the numbers of the minutiae in a common region 401 (cf. FIG. 4) of said search fingerprint and said reference fingerprint respectively. Said common region 401 is the region where said search fingerprint and said reference fingerprint overlap each other using said given coordinate system. Said common region 401 is obtained by transforming a rectangle 402 which defines a region of interest of said reference fingerprint to said search fingerprint by an appropriate angle and translation amount as given by the corresponding base information. This is graphically shown in FIG. 4 where a shaded region is said common region 401.

Accordingly, the degree of match is determined from said second similarity degree and the number of minutiae in said common region of said search and said reference fingerprints.

Two fingerprints will be verified as that of the same finger if and only if the number of the minutiae in said common region 401 (max (N1, N2) is larger than a first predefined threshold N, and an area cs of the common region 401 is larger than a second predefined threshold S, and said degree of match ms is larger than a third predefined threshold T.

By taking into consideration not only the degree of match, but also the number of the minutiae in said common region and the area of said common region of the search fingerprint and the reference fingerprint according to this embodiment of the invention, the reliability of the fingerprint identification/verification is significantly increased.

After having determined a result, whether said search fingerprint is matched with a reference fingerprint according to the method described above, said computer 100 sends a result signal to said display 114 where the result is presented to a user.

Then, the computer program stops execution (step 209).

While the preferred embodiments of this invention and modifications thereof have so far been described with reference to the accompanying drawing, it will now readily be possible for one skilled in the art to carry this invention into effect in various other manners.

In the embodiment described above the two next minutiae i and j, respectively, are taken into consideration for determining a local search feature vector. However, there is no limit in the amount of how many neighborhood minutia may be taken into account.

The embodiment described above relies on only one best matched of local structure pairs cl(b1, b2) of search feature vector and reference feature vector. In an alternative it is also possible to use a plurality of pairs as a plurality of bases, which would even improve the achievable reliability of the result.

Said degree of match may also be obtained by simply adding the number of the matched minutiae.

Furthermore, in an alternative of the embodiment described above, one may also use the following criterion for determining a said best match structure pair:

$$cl(b1, b2) = \min_{k1, k2}(\|FL^S_{k1} - FL^R_{k2}\|) \quad (12)$$

It should be mentioned, that in this alternative, said weight vector W is not used. A plurality of bases may be used in this case as well.

What is claimed is:

1. A method for determining a degree of match between a search fingerprint and a reference fingerprint comprising the following steps:

extracting at least one first search feature from a first region of said search fingerprint thereby forming a local search feature vector, extracting at least one second search feature from a second region of said search fingerprint thereby forming a global search feature vector, wherein said second region comprises said first region, determining a first similarity degree by comparing said local search feature vector with a local reference feature vector of said reference fingerprint, determining a second similarity degree by comparing said global search feature vector with a global reference feature vector of said reference fingerprint and using said first similarity degree;

determining said degree of match from said second similarity degree, wherein said feature vectors describe minutiae of said fingerprints or a relation between minutiae of said fingerprints; and further comprising the steps of determining said first similarity degree for all minutiae in said first region, determining a best match local structure pair of minutiae by using said first similarity degrees, aligning all minutiae in said second region based on said best match local structure pair, thereby forming said global search feature vector; and wherein said first similarity degree $cl(k1, k2)$ is determined using the following formula:

$$cl(k1, k2) = \begin{cases} \dfrac{b1 - W \times |FL_{k1}^S - FL_{k2}^R|}{b1}, & \text{if } W \times |FL_{k1}^S - FL_{k2}^R| < b1 \\ 0, & \text{Others} \end{cases}$$

wherein b1 is a freely selectable local threshold,

W is a freely selectable weight vector that specifies the weight associated with each component of said feature vector, $FL_{k1}^S$ is a local search feature vector of minutia k1, $FL_{k2}^R$ is a local reference feature vector of minutia k2.

2. A method according to claim 1, wherein said features are independent from rotation and/or translation of the fingerprints compared with a given coordinate system.

3. A method according to claim 1 or 2 wherein said first region comprises a given first amount of neighbor minutiae, said second region comprises a given second amount of neighbor minutiae, said second amount is larger than said first amount.

4. A method according to claim 1, wherein said second similarity degree $cg(k1, k2)$ is determined using the following formula:

$$cg(k1, k2) = \begin{cases} cl(k1, k2), & \text{if } |FG_{k1b}^S - FG_{k2b}^R| < bg \\ 0, & \text{Others} \end{cases},$$

wherein bg is a freely selectable global threshold vector, $FG_{k1b}^S$ is a global search feature vector of minutia k1, $FG_{k2b}^R$ is a global reference feature vector of minutia k2.

5. A method according to claim 4, wherein said degree of match is determined using the following formula:

$$ms = \frac{\sum cg(k1, k2)}{\max(N1, N2)},$$

wherein N1 and N2 are the numbers of minutiae in a common region of said search fingerprint and said reference fingerprint, and ms is said degree of match.

* * * * *